Sept. 7, 1926.

A. CROSBY

BAIT SPOON HOOK

Filed August 17, 1925   2 Sheets-Sheet 1

1,598,958

A. Crosby
Inventor

Sept. 7, 1926.
A. CROSBY
1,598,958
BAIT SPOON HOOK
Filed August 17, 1925  2 Sheets-Sheet 2
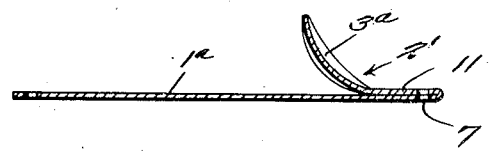
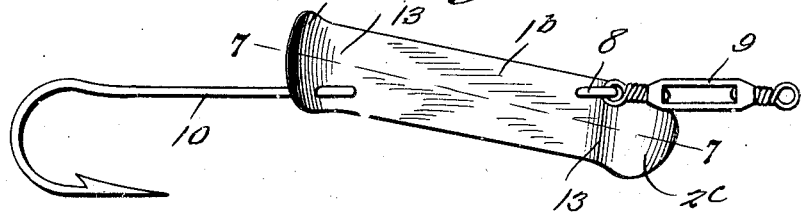
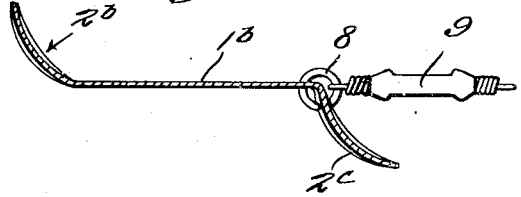
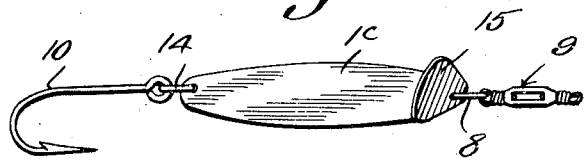
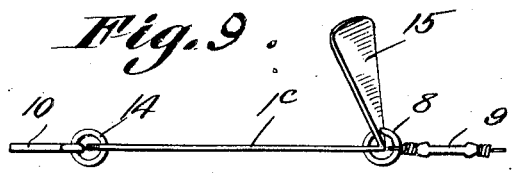
A. Crosby
Inventor
By C.A. Snow & Co.
Attorneys.

Patented Sept. 7, 1926.

1,598,958

UNITED STATES PATENT OFFICE.

ARTHUR CROSBY, OF TACOMA, WASHINGTON.

BAIT SPOON HOOK.

Application filed August 17, 1925. Serial No. 50,681.

This invention relates to spoon hooks to be used in catching fish by trolling.

The objection of the invention is to provide a bait spoon hook so constructed that when dragged through the water it will have a spiral motion with an occasional dart.

Another object of the invention is to provide a hook of this character so constructed that the hook proper is attached to the straight blade so that all the strain will be directly on the base portion of the blade to avoid changing the action of the spoon no matter how large the fish or how small the spoon.

Another object is to provide a hook of this character having a flat blade spoon with an offset so arranged and the hook itself so attached to the blade that it can not straighten the offset and spoil the action of the spoon.

Another object of the invention is to provide a hook of this character in which the spoon is always out of balance regardless of the condition of the hook or swivel and in which a straight blade is employed to strengthen the indestructibility of action.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings:—

Figure 5 is a longitudinal section taken on the line 5—5 of Figure 4.

Figure 6 is a plan view of still another form of the invention.

Figure 7 is a longitudinal section taken on the line 7—7 of Figure 6.

Figure 8 is a plan view of still another form of the invention, and

Figure 9 is an edge or side view of the form shown in Figure 8.

Figure 1:
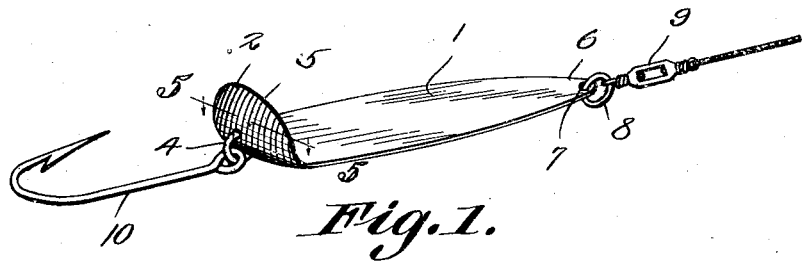
Figure 1 represents a perspective view of the preferred form of the invention.
Figure 2:
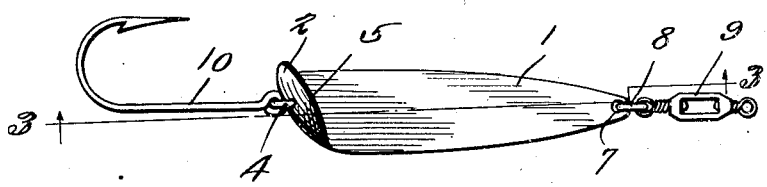
Figure 2 is a plan view thereof.
Figure 3:
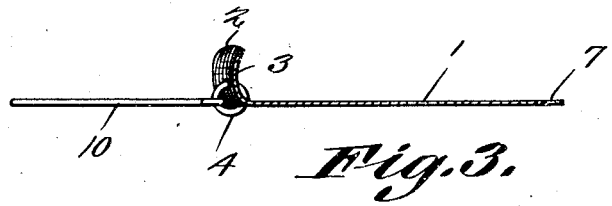
Figure 3 is a longitudinal section taken on the line 3—3 of Figure 2.

In the form shown in Figs. 1, 2 and 3 a straight hard metal plate or blade 1 is shown having its rear end bent obliquely to form a spoon 2, having a concave bowl 3 facing inwardly as is shown clearly in Fig. 3.

A hook 10 has the shank thereof connected with said spoon by ring 4 which is passed through the body of the spoon and blade 1 at a point at one side of the longitudinal axis of the blade as is shown clearly in Fig. 2. This connection of the hook with the plate prevents all possibility of strain exerted on the hook operating to straighten the spoon and interfering with its proper action.

The spoon 2 is shown located at one end as indicated at 5 while the opposite end of the plate is tapered to a point as shown at 6 and said point has an aperture 7 formed therein to receive there a ring 8 with which the line connected swivel 9 is engaged.

The hook 10 has a shank so constructed that it will lie flat with the blade 1 of the spoon. By connecting the hook on one side edge, preferably the shorter edge causes a spiral motion to be imparted to the bait with an occasional dart which constitutes the gist of the invention.

Figure 4:
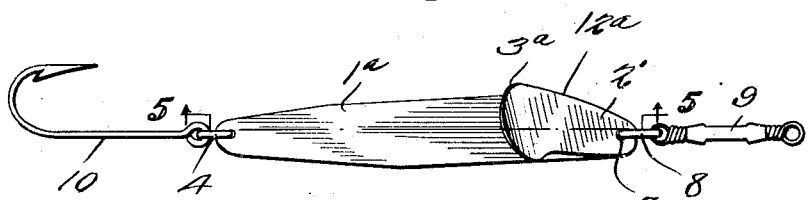
Figure 4 is a plan view showing a slightly different form of the invention.

In the form shown in Figure 4 the flat straight blade $1^a$ has its rear end rounded which is connected to the hook 10 by the ring 4. The front end of the plate $1^a$ is made tapered and has folded back thereon a spoon $2'$ the bowl portion $3^a$ of which is bent at an oblique angle and the concave portion of the spoon faces forwardly. The shank 11 of the spoon lies flat on the upper face of the plate $1^a$ and said shank and the plate are provided with registering apertures shown at 7 to receive the ring 8 which connects the bait with the swivel 9. The hook 10 is connected with the plate $1^a$ at one side of the median or longitudinal axis thereof at the opposed end of said plate.

In the forms shown in Figs. 6 and 7 the flat blade $1^b$ is provided at both ends with spoons or offsets $2^b$ and $2^c$, one being bent in one direction and the other in the opposite direction as is shown clearly in Fig. 7 the concave portions of these spoons facing in the same direction, that is, toward the front. These spoon-shaped ends are bent at an oblique angle as shown at 13, that is, the bend extends transversely of the plate and the rear spoon shaped portion or offset $2^b$ is bent laterally upward at an angle a little greater than 45° while the front end $2^c$ which carries the hook 10 is bent downwardly and laterally at an angle of about the same as that of the end 2ᵇ with the concave portion facing towards the front or the line end of the plate.

The ring 8 which connects the plate 1ᵇ with the swivel 9 extends through the base portion of the spoon shaped end 2ᶜ and through the body of the blade or plate 1ᵇ adjacent one edge thereof as is shown clearly in Fig. 6 while the hook 10 extends similarly through the other end of the plate at a point adjacent the opposed side edge so that the ring 8 and the hook 10 are arranged at diagonally opposite corners of plate 1ᵇ so that when a pull is exerted on the line connected with the swivel the plate will have a twirling motion imparted thereto with an occasional dart.

In the form shown in Figs. 8 and 9 the plate 1ᶜ is substantially ovate in form with the hook 10 connected by a ring 14 with one end thereof at one side of the longitudinal median line thereof while the opposed end has a wing 15 extended upwardly therefrom at an oblique angle and through the base of which and the adjacent edge of the plate extends a swivel connecting ring 8.

The wing 15 is substantially pear-shaped with the smaller end connected with and preferably formed integral with the plate 1ᶜ. This wing 15 imparts a spiral or twirling motion to the plate when it is drawn through the water.

All of the forms above described and shown in the respective figures will when the bait is drawn through the water have a twirling motion with an occasional dart imparted thereto which is very effective in misleading the fish causing it to think that the bait is a real live bait, which he grabs and swallows as is designed.

The hook 10 in all forms of the bait has the shank thereof so arranged that it will lie flat with the body of the spoon that is, with the blade portion thereof.

It is to be understood that the angle that the spoon or offset end of the blade is bent must vary according to the size and the width of the blade.

I claim:—

1. A device of the class described comprising a flat blade having an offset at one end arranged at an oblique angle to the blade transversely thereof with a swivel connecting ring extending through the base of said offset and through said blade, and a hook connected with the blade at the other end thereof, the offset end of said blade having a spoon shaped concaved inner face facing the front end or the end on which the pull is exerted.

2. A device of the class described comprising a blade, said blade having an end portion extending at an angle with respect to the blade, said angularly extended portion being spoon-shaped, and a ring passing through the blade and the angularly disposed section to connect a fish line to the blade.

In testimony that I claim the foregoing as my own, I have hereto affixed my signature.

ARTHUR CROSBY.